(12) United States Patent
Mäkelä

(10) Patent No.: US 8,434,719 B2
(45) Date of Patent: May 7, 2013

(54) LEADING EDGE ELEMENT OF AIRCRAFT, METHOD FOR MANUFACTURING ONE, WING AND STABILIZER

(75) Inventor: Juha Mäkelä, Nokia (FI)

(73) Assignee: Patria Acostructures Oy, Halli (FI)

( * ) Notice: Subject to any disclaimer, the term of this patent is extended or adjusted under 35 U.S.C. 154(b) by 249 days.

(21) Appl. No.: 12/921,037

(22) PCT Filed: Mar. 12, 2009

(86) PCT No.: PCT/FI2009/050197
§ 371 (c)(1),
(2), (4) Date: Nov. 15, 2010

(87) PCT Pub. No.: WO2009/112641
PCT Pub. Date: Sep. 17, 2009

(65) Prior Publication Data
US 2011/0049298 A1 Mar. 3, 2011

(30) Foreign Application Priority Data
Mar. 13, 2008 (FI) ...................................... 20080208

(51) Int. Cl.
*B64C 3/18* (2006.01)
(52) U.S. Cl.
USPC .................. 244/123.14; 244/123.1; 244/123.8
(58) Field of Classification Search ................ 244/123.1, 244/123.14, 123.3, 123.7–123.9, 134 R
See application file for complete search history.

(56) References Cited

U.S. PATENT DOCUMENTS

| 1,343,707 | A | | 6/1920 | Carns | |
|---|---|---|---|---|---|
| 1,850,823 | A | * | 3/1932 | Bellanca | 244/123.1 |
| 1,861,596 | A | * | 6/1932 | Dornier | 244/123.8 |
| 2,218,122 | A | * | 10/1940 | Scheller et al. | 244/123.8 |
| 2,613,893 | A | * | 10/1952 | Young | 244/123.1 |
| 4,667,905 | A | * | 5/1987 | Hamm et al. | 244/123.13 |
| 5,362,347 | A | * | 11/1994 | Domine | 156/214 |
| 2002/0011540 | A1 | * | 1/2002 | De Castro Nodal et al. | 244/45 R |

FOREIGN PATENT DOCUMENTS

| EP | 2 130 762 A2 | 12/2009 |
|---|---|---|
| EP | 2 196 391 A2 | 6/2010 |
| GB | 339132 | 12/1930 |
| JP | 2003-291895 A | 10/2003 |
| WO | 2008/012569 A1 | 1/2008 |

OTHER PUBLICATIONS

Search and Examination Report dated Oct. 13, 2010 from the British Patent Office in respect of counterpart GB Application No. 1015661.0.

(Continued)

*Primary Examiner* — Tien Dinh
*Assistant Examiner* — Nicholas McFall
(74) *Attorney, Agent, or Firm* — Ladas & Parry LLP (57) ABSTRACT

A leading edge element, a method for manufacturing one, and an aircraft wing and stabilizer furnished with the leading edge element. The leading edge element is an elongate piece that comprises a skin plate and at least one longitudinal stiffener. The shape of the front edge of the skin plate is closed and the tail edge is open. The stiffener is fastened between the inner surfaces of the skin plate. Between the inner surface of the skin plate of the outermost longitudinal stiffener, there is a longitudinal space free of transverse stiffeners.

24 Claims, 7 Drawing Sheets

OTHER PUBLICATIONS

Abstract of JP 2003-291895 A.
Thermoplastic Composites Gain Leading Edge on the A380, High Performance Composites, Mar. 1, 2006, s. 4, kuviot, s. 5, kappale 4, s. 6, kappale 1.

* cited by examiner

LEADING EDGE ELEMENT OF AIRCRAFT, METHOD FOR MANUFACTURING ONE, WING AND STABILIZER

BACKGROUND OF THE INVENTION

The invention relates to a leading edge element of the leading edge of a wing or stabilizer in an aircraft, the element comprising a skin plate that has an essentially C-shaped cross-section or some other shape with a closed front edge and open tail edge as seen in the longitudinal direction. The leading edge element further comprises a support structure arranged on the inner surface side of the skin plate.

The invention also relates to a method for manufacturing a leading edge element, and to a wing and stabilizer furnished with a leading edge element of the invention. The subject matters of the invention are defined in detail in the preambles of the independent claims of the application.

The wings of aircrafts, such as airplanes and the like, comprise skin plates between which the actual support structure of the wing resides, the support structure typically comprising longitudinal front and rear spars of the wing, transverse wing ribs joining the spars, and stringers between the wing ribs and skin plates. On the leading edge of a wing, that is, on the front edge of the wing as seen in the direction of flight, there is one or more leading edge elements that form the outermost section of the wing. The leading edge element is fastened to the support structure of the wing and comprises its own skin plate and support structure. A disadvantage of the present leading edge element structures is that their support structures are complex, whereby their manufacture is slow and expensive.

BRIEF DESCRIPTION OF THE INVENTION

It is an object of this invention to provide a novel and improved leading edge element, a novel and improved leading edge of a wing and stabilizer, and a novel and improved method for manufacturing a leading edge element.

The leading edge element of the invention is characterised in that the stiffener closest to the outermost front edge of the leading edge element is an elongated piece in the longitudinal direction of the leading edge element, whereby the inner surface of the skin plate and the outermost longitudinal stiffener define a longitudinal space on the front edge of the leading edge element.

The method of the invention is characterised by arranging as the stiffener closest to the outermost front edge of the leading edge element an elongated stiffener piece in the longitudinal direction of the leading edge element, and leaving the elongated space defined by the inner surface of the skin plate and the outermost stiffener at the front edge of the leading edge element without stiffeners.

The wing and stabilizer of the invention are characterised in that their leading edges comprise one or more leading edge elements of the invention. More detailed definitions are disclosed in the independent claims.

The idea of the invention is that the first stiffener piece from the front edge of the leading edge element is a stiffener in the longitudinal direction of the element. The front edge of the leading edge element then has a longitudinal space that is free of transverse stiffener pieces.

An advantage of the invention is that the leading edge element is easier to manufacture, which leads to a faster manufacture and a reduction in manufacturing costs. The solution of the invention does not require large numbers of arc-like transverse stiffener pieces whose fastening is arduous. Instead of transverse arc-like stiffeners, one or more elongated longitudinal stiffeners are used. The leading edge element of the invention also withstands well any impacts directed thereto, such as collisions with birds.

The idea of an embodiment is that at least the outermost stiffener is an elongated plate-like piece with longitudinal edges furnished with fastening sections at which the stiffener fastens to the inner surface of the skin plate.

The idea of an embodiment is that at least the outermost stiffener is an elongated plate-like piece with both longitudinal edges bent in the same direction to form fastening sections. The fastening sections and the planar middle section, or web, between them provide the stiffener with an essentially C-shaped cross-section. The stiffener is fastened to the inner surface of the skin plate at these fastening sections.

The idea of an embodiment is that the leading edge element comprises two parallel stiffeners in the longitudinal direction of the leading edge arranged at a distance from each other. The stiffeners may have an essentially C-shaped cross-section and they may be positioned in the same way or differently, whereby the C shapes may open in the same direction or in different directions. In the latter case, they may open towards each other or away from each other.

The idea of an embodiment is that the leading edge element comprises three parallel stiffeners in the longitudinal direction of the leading edge arranged at a distance from each other.

The idea of an embodiment is that the stiffener is a tubular piece.

The idea of an embodiment is that the stiffener is a tubular piece with end flanges at its ends. The stiffener is then box-type structure.

The idea of an embodiment is that the stiffener comprises at least one transverse through-groove. The through-groove is dimensioned to extend a predefined distance from the bottom part of the stiffener to its top part.

The idea of an embodiment is that the skin plate and stiffener are separate components that are manufactured in separate steps and fastened together when the leading edge element is assembled.

The idea of an embodiment is that the stiffener comprises several openings to reduce its weight.

The idea of an embodiment is that the stiffener piece is made of a composite material. The composite material comprises one or more binding agents and one or more reinforcement materials.

The idea of an embodiment is that the skin plate and stiffener piece are integrated together during manufacturing so that they are one uniform inseparable piece.

BRIEF DESCRIPTION OF FIGURES

Some embodiments of the invention are described in more detail in the attached drawings in which.

In the figures, some embodiments of the invention are shown simplified for the sake of clarity. Similar parts are marked with the same reference numbers in the figures.

DETAILED DESCRIPTION OF THE INVENTION

Figure 1:
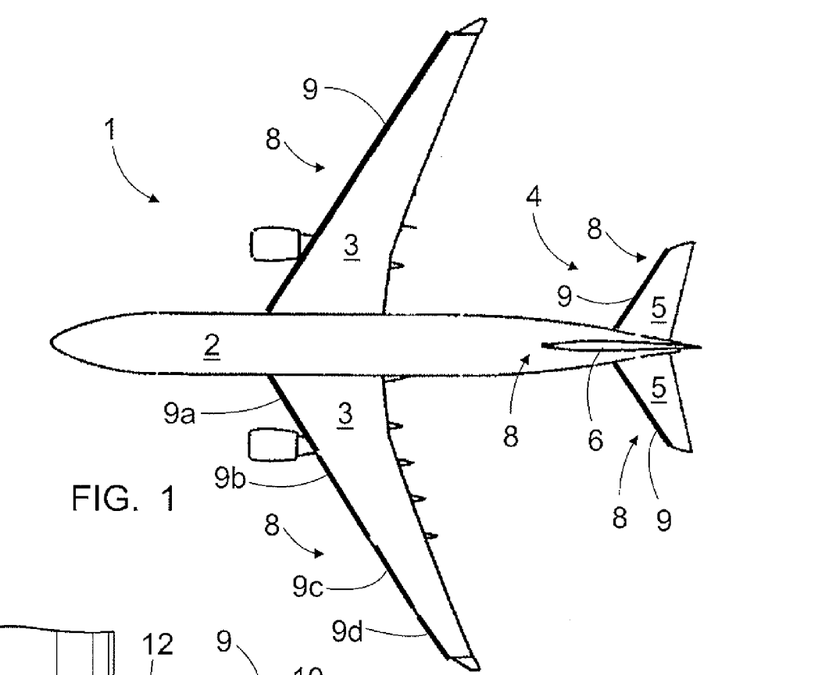
FIG. 1 is a schematic representation of an aircraft as seen from above.
Figures 2, 3:
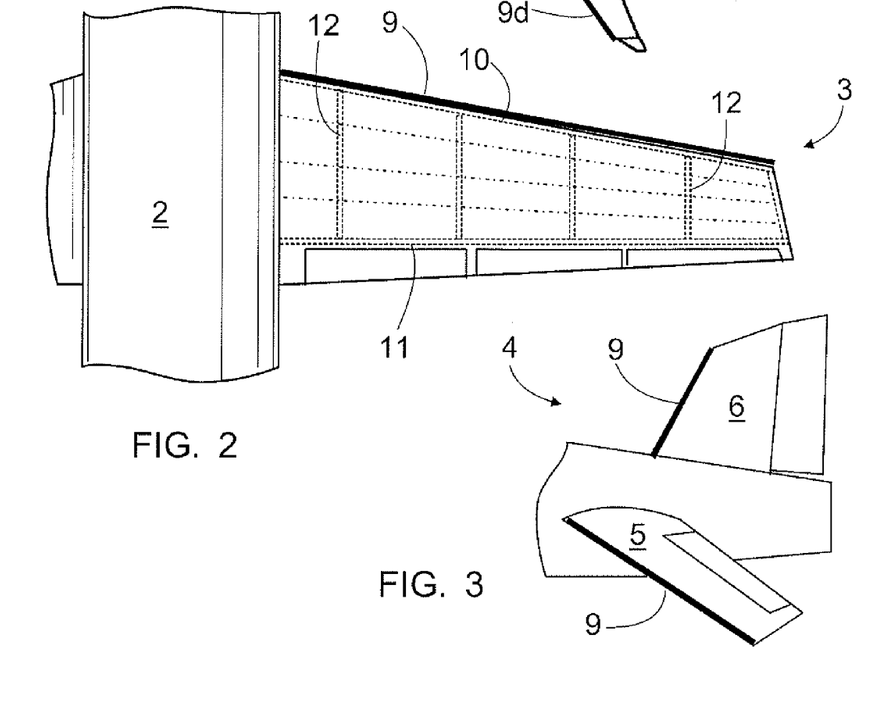
FIG. 2 is a schematic representation of a wing and its structure as seen from above.
FIG. 3 is a schematic side representation of the tail end of an aircraft and the stabilizers therein.

FIG. 1 shows an airplane 1 from the top. Wings 3 are fastened to the fuselage 2 of the airplane and the plane has stabilizers 5 and 6 in its tail end 4. The structure of the wing 3 is shown in more detail in FIG. 2, and FIG. 3 shows the tail end 4 from the side. Trailing edges 7 of the wings 3 and stabilizers 5, 6 may be furnished with control surfaces. Leading edges 8 of the wings 3 and stabilizers 5, 6 may comprise one uniform leading edge element 9, or alternatively several leading edge elements 9a to 9d may be arranged one after the other. The leading edge element 9 forms the outermost edge of the wing or stabilizer. The leading edge element 9 may be a separate piece that may be detachably fastened to the support structures of the wing 3.

The wing 3 may comprise top and bottom skin plates with a wing support structure between them that may comprise a front spar 10 and a rear spar 11 and several wing ribs 12 arranged between the spars. The front and rear spars 5, 6 are thus stiffeners that are essentially in the longitudinal direction of the wing, whereas the wing ribs 12 are stiffeners in the transverse direction of the wing. In addition, the support structure of the wing may comprise several stringers that may be fastened to the inner surface of the skin plates and to the wing ribs 12. The leading edge element 9 may be fastened to the front spar 5. As can be seen in FIG. 1, the leading edge element 9 may extend as a uniform piece along the entire portion of the front edge of the wing 3 or stabilizer 5, 6, or alternatively the front edge of the wing or stabilizer may have two or more leading edge components 9a to 9d arranged one after the other so that together they form the leading edge. In the latter case, there may be gaps between the ends of the leading edge components 9a to 9d to control the bending of the leading edge. The structure of the stabilizers 5, 6 shown in FIG. 3 may primarily correspond to the structure of the wing.

Figure 4:
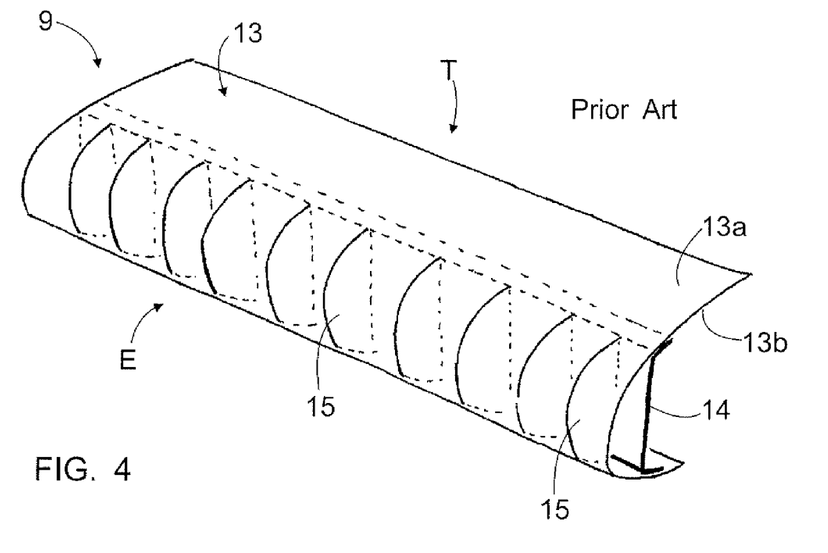
FIG. 4 is a perspective representation of a leading edge element according to the prior art.

FIG. 4 shows a prior-art leading edge element 9 that comprises a skin plate 13 with a support structure arranged on the inner surface side of it. The support structure comprises a longitudinal stiffener 14, to which a large number of arc-like blades 15 directed towards the front edge E are fastened. Fastening the transverse blades 15 to the stiffener 14 and the inner surface of the skin plate 13 is arduous and slow. In addition, it is necessary to manufacture a large number of separate arc-like blades 15.

Figure 5:
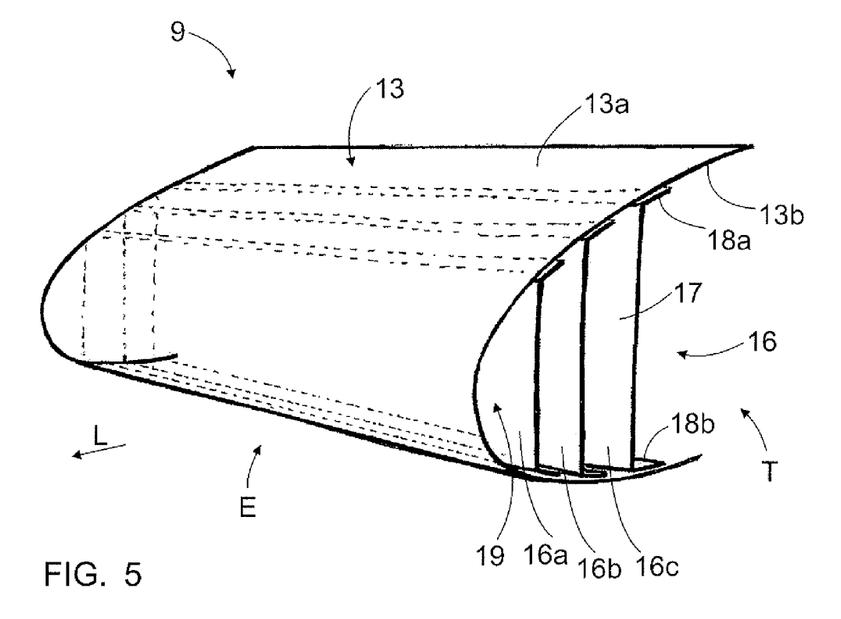
FIG. 5 is a schematic and perspective representation of a leading edge element according to the invention, which is furnished with three essentially plate-like longitudinal stiffeners.
Figure 6:
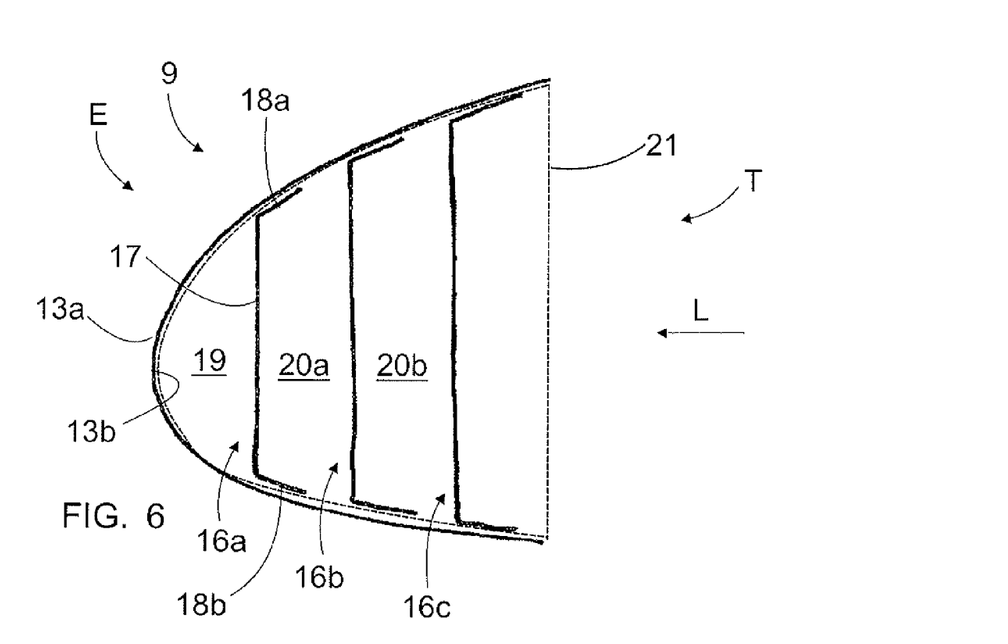
FIG. 6 is a schematic representation of the cross-section of the leading edge element shown in FIG. 5.

The solution of the invention shown in FIGS. 5 and 6 is in turn simpler in structure and, therefore, also easier to manufacture. The skin plate 13 is essentially C-shaped in cross-section in such a manner that the front edge E in the direction of flight L is curved and the opposite tail edge T is open. The shape of the skin plate 13 may naturally be angular or even sharp instead of curved, but it is still a structure with a closed front edge E and open tail edge T. The skin plate 13 has, as seen in the longitudinal direction, branches that point backward at a distance from each other. Typically, the skin plate 13 opens or widens toward the tail edge T. The skin plate 13 may have a curved outer surface 13a and a curved inner surface 13b. To the inner surface 13b, longitudinal stiffeners 16 are fastened, which in this case are three parallel one-directional stiffeners 16a to 16c. The stiffeners 16 may be elongated plate-like pieces having an essentially planar web 17 and transverse fastening sections 18a and 18b on their longitudinal edges. The fastening sections 18 may be oblique or they may be curved. The stiffeners 16 are fastened from the fastening sections 18a, 18b to the inner surface 13b of the skin plate so that they form a structure connecting the opposite parts or branches of the curved inner surface 13b. The stiffeners 16a to 16c may be arranged at a distance from each other. The outermost first stiffener 16a is at a distance from the frontmost part of the inner surface 13b of the skin plate. The inner surface 13b of the front part and the first stiffener 16a define a longitudinal space 19 in the outermost front part of the leading edge element 9. The leading edge element 9 does not comprise any transverse arc-like stiffeners or the like whose assembly and manufacture is slow and difficult. Instead, the fastening and manufacturing of the longitudinal stiffeners 16 are fast. The space 19 in the front edge E and the longitudinal spaces 20a and 20b between the stiffeners may be left as empty, hollow spaces, or they may, if necessary, be filled with a light foamy filler, for instance filler of polymer material. The specific weight of the filler can be lighter than that of the skin plate and stiffener. The stiffener pieces 16a to 16c may be manufactured of a composite material, and they may be fastened with glue from the fastening sections 18a, 18b to the inner surface 13b of the skin plate. It is naturally also possible to use other fastening means, such as screws or riveting or the like.

FIG. 6 also shows with a dashed line the end piece 21 of the leading edge element 9. The end piece 21 may be arranged at both ends of the leading edge element 9, and they may be used to fasten the leading edge element 9 to the front spar. The end piece 21 may be arranged to cover only the area of the stiffeners 16 and to transmit forces between the stiffeners and the front spar. Alternatively, the forces may be transmitted by means of the end pieces or corresponding flanges to the rest of the support structure of the wing or stabilizer.

Figure 7:
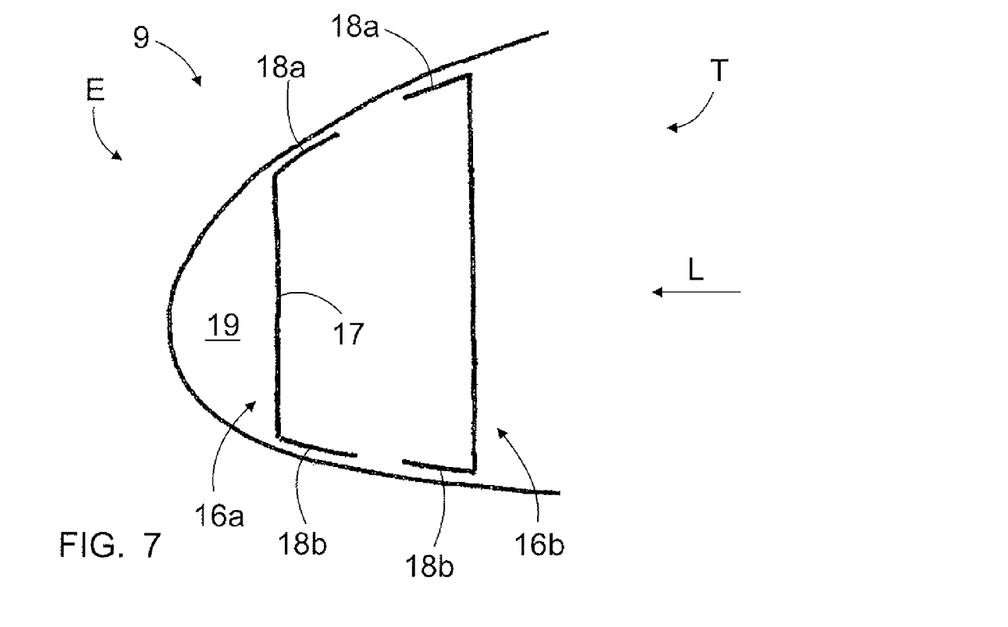
FIG. 7 is a schematic cross-sectional representation of a second leading edge element according to the invention, which comprises two longitudinal stiffeners whose fastening section face each other.

The solution shown in FIG. 7 comprises two longitudinal stiffeners 16a, 16b that are arranged at a distance from each other so that a longitudinal space 20 remains between them. Differing from FIG. 6, the fastening sections 18 of the stiffeners 16a, 16b point at each other.

Figure 8:
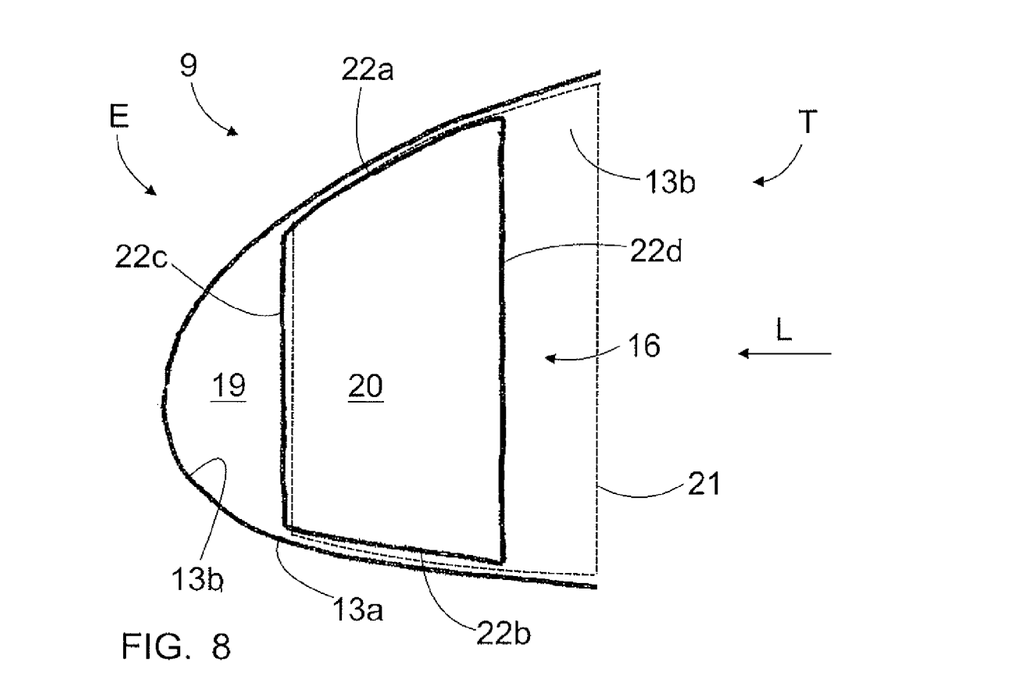
FIG. 8 is a schematic cross-sectional representation of a third leading edge element according to the invention, which comprises a longitudinal stiffener having a tubular cross-section and fastened against the inner surfaces of the skin plate.

FIG. 8 shows an application in which the stiffener 16 is tubular. The stiffener 16 may then have curved sides 22a and 22b designed according to the inner surface 13b of the skin plate as well as essentially planar sides 22c and 22d between them. The curved sides 22a, 22b may be essentially horizontal and the sides 22c, 22d essentially vertical when the wing is examined in its normal horizontal flight position. A longitudinal space 20 remains inside the stiffener 16. Further, the ends of the stiffener 16 may be furnished with end pieces 21, in which case the stiffener 16 has a box-type structure. As is generally known, a box-type structure is strength-wise advantageous. In addition, by means of the end pieces 21, the leading edge element 9 may be fastened to the wing or stabilizer. It is further possible to use the end piece 21 to transmit forces between the leading edge element 9 and the support structures of the wing or stabilizer. Naturally, the tubular stiffener 16 may also have some other type of cross-section than what is shown in the figure as an example.

Figure 9:
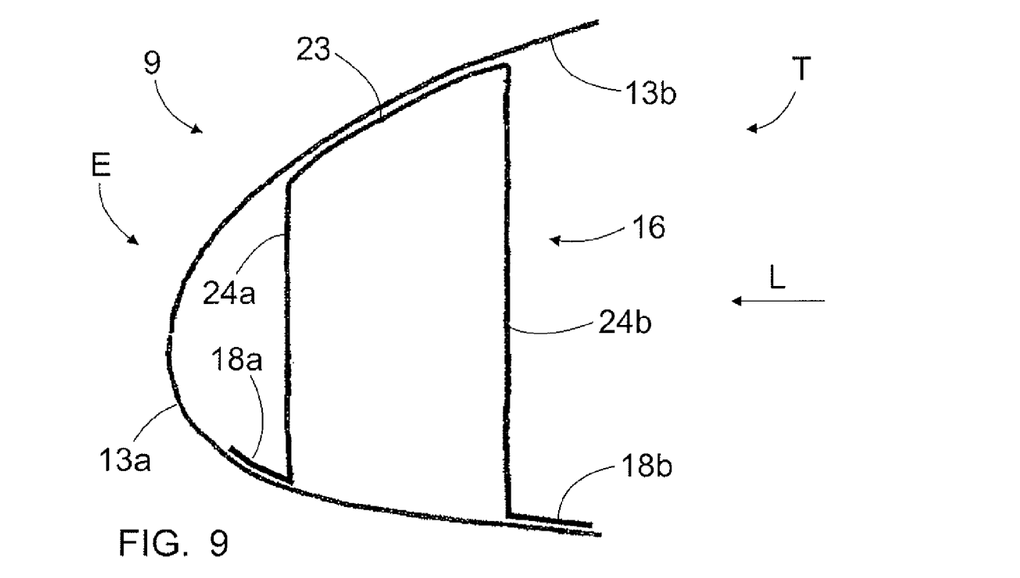
FIG. 9 is a schematic cross-sectional representation of a fourth leading edge element according to the invention, which comprises a longitudinal stiffener with an essentially U-shaped cross-section.

The leading edge element 9 shown in FIG. 9 comprises a stiffener 16 with an essentially U-shaped cross-section, in which the curved bottom 23 may be designed according to the inner surface 13b of the skin plate and in which the outermost ends of the branches 24a, 24b of the U may be furnished with transverse fastening sections 18a, 18b. The fastening sections 18a, 18b may also be designed curved according to the shape of the inner surface 13b. The stiffener 16 may be fastened at the curved bottom 23 and from the fastening sections 18a, 18b to the inner surface 13b. In the application of the figure, the stiffener 16 is arranged to open downward, but it is possible to arrange the U-shaped stiffener to open upward.

Figure 10:
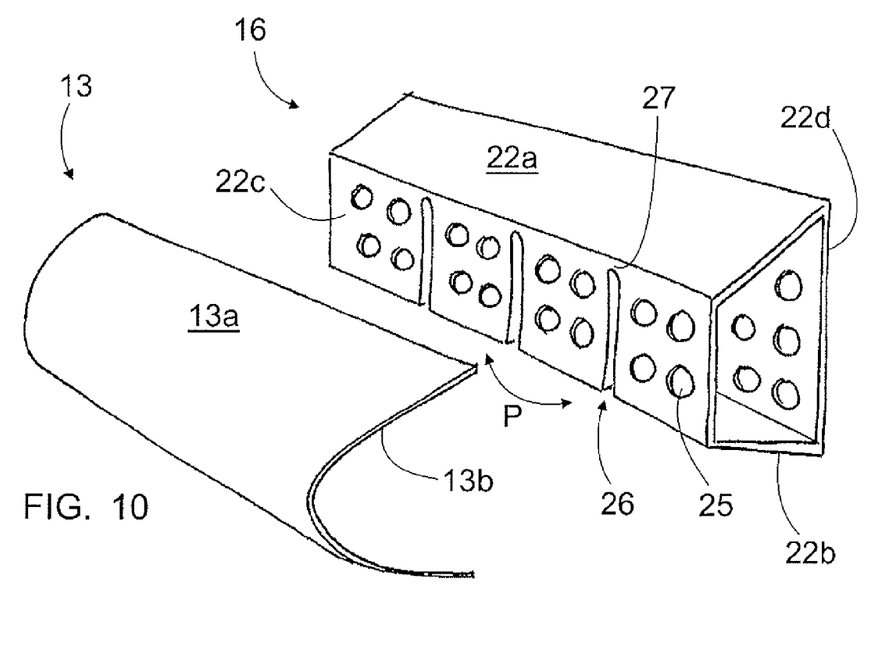
FIG. 10 is a schematic and perspective representation of a leading edge element that is assembled by joining together a skin plate and longitudinal stiffener manufactured in separate steps.

FIG. 10 shows an embodiment, in which the stiffener 16 is a tubular piece that is made in a separate step in relation to the skin plate 13 and that is during assembly fastened to the inner surface 13b of the skin plate. The stiffener 16 may have end pieces, even though these are not shown in the figure for the sake of clarity. The leading edge element 9 according to the embodiment thus comprises only two components that are fastened together during assembly. FIG. 10 also shows that the stiffener 16 may have several through-holes 25 that lighten the structure. There may be openings 25 in the side surfaces 22c and 22d as well as in the surfaces 22a, 22b. Further, the stiffener 16 may have one or more through-grooves 26 that may begin from the bottom surface 22b of the stiffener 16 and extend a predefined distance toward the top side 22a while intersecting sides 22c and 22d, or at least one of them. As can be seen in the figure, a neck 27 remains between the endpoint of the through-groove 26 and the side 22a above it, in other words, the through-groove 26 does not intersect the side 22a or the topmost section of the sides 22c and 22d. With the number and dimensioning of the through-grooves 26, it is possible to affect the bending properties of the leading edge element 9 in direction P.

Even though the lightening holes 25 and through-grooves 26 are only shown in FIG. 10, it is naturally clear that they may also exist in any leading edge element 9 stiffener 16 described in this application.

It is further possible that the skin plates of the stiffener comprise corrugated stiffeners that are integrated to its structure.

The cross-sectional profile of the stiffener 16 may naturally also be of another type, such as an i profile, in which case the stiffener comprises a web in the middle and fastening sections facing in opposing directions on each longitudinal edge. It is further possible that the fastening section on the first longitudinal edge points in one direction and the fastening section on the second longitudinal edge points in another direction, in which case the cross-section of the profile resembles the letter z. The profile of the stiffener with a tubular cross-section may also be selected as necessary. The vertical surfaces of the stiffeners shown in the figures may also be lattice-like or grid-like. It is naturally clear that the support structures of the leading edge element may combine various longitudinal stiffener pieces according to the idea of this application. In some cases, there may be more than three longitudinal stiffeners, for instance four, five, or even more.

Figure 11:
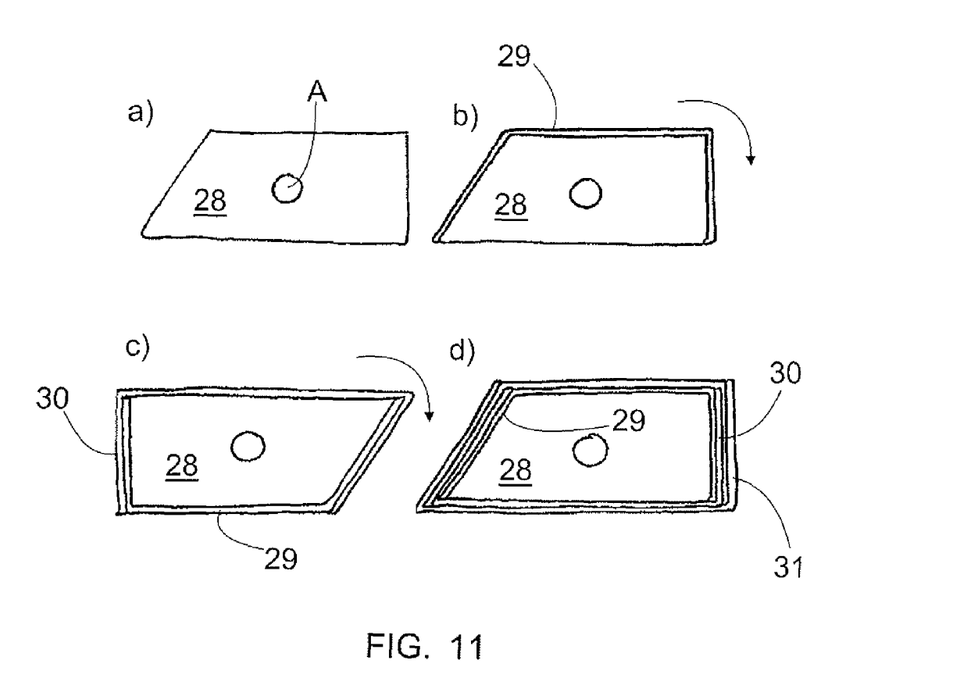
FIG. 11 is a schematic representation of a possible method for manufacturing a stiffener by means of a core.

FIG. 11 shows the manufacturing steps of a stiffener piece 16. The manufacturing method uses a core 28 shown in partial figure a, on top of which it is possible to laminate, in the manner shown in partial figure b, a first layer 29, after which the core 28 is turned 180° around its turning axis A. After this, a second layer 30 is laminated on the core 28 as shown in partial figure c. The core 28 is then again turned 180° around its turning axis and a third layer 31 is laminated as shown in partial figure d. Next, the tool, that is, core 28, may be arranged inside a vacuum bag or the like, after which air is sucked out of the bag and the piece hardened. After hardening the core 28 is pulled out in the longitudinal direction and the tubular stiffener is finished. If necessary, it is possible to make final finishing to it before assembly. During finishing, it is for instance possible to drill or mill desired lightening holes and through-grooves thereto. Further, it is possible to fasten transverse end flanges or corresponding support or flange elements with which the stiffener may be fastened to the front spar and with which forces may be transmitted from the stiffener to the support structure of the wing or stabilizer.

Figure 12:
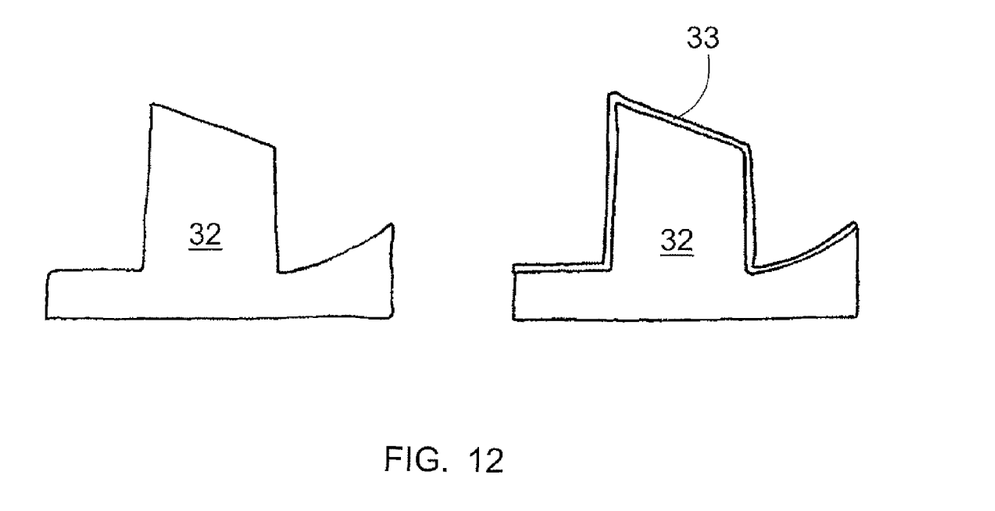
FIG. 12 is a schematic representation of a second method for manufacturing a stiffener by means of a laminating tool.

In FIG. 12, the stiffener 16 is laminated on a mould tool 32. The mould 32 defines the profile of the forming stiffener. The mould 32 and the layer 33 laminated on its surface are arranged in a vacuum bag or the like, after which a negative pressure is created in the bag and the layer 33 is hardened. Next, the hardened stiffener is detached and it is post-processed as necessary. The mould 32 of FIG. 12 produces a stiffener as shown in FIG. 9.

Figure 13:
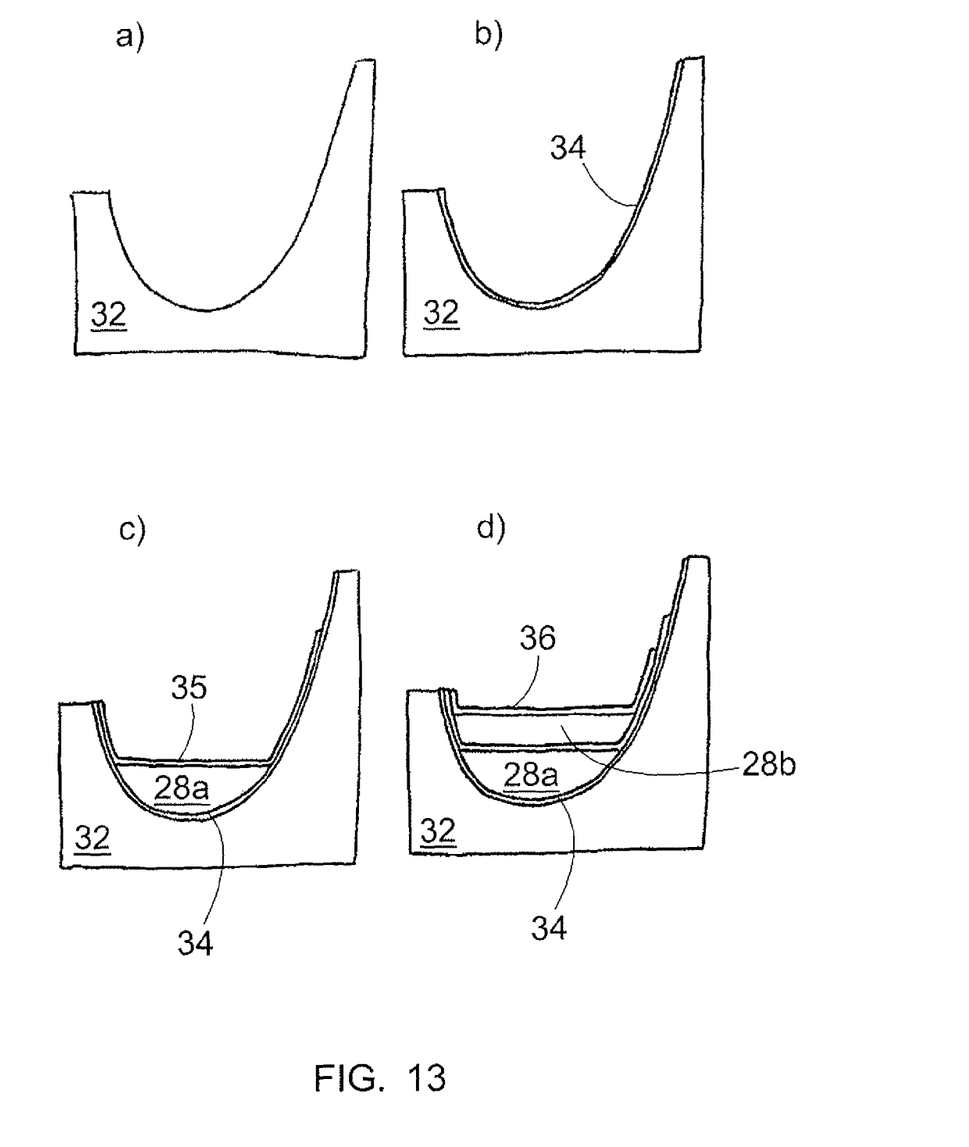
FIG. 13 is a schematic representation of a third method for manufacturing a stiffener, in which the leading edge element is manufacture in one step into a finished integrated piece in which the skin plate and stiffeners are parts that cannot be separated from each other.

FIG. 13 presents by means of partial figures a to d a method for manufacturing a fully integrated leading edge element 9. Against the surface of the mould tool 32, a layer 34 forming the skin plate is first laminated as shown in partial figure b, then a first core 28a is arranged on top of the layer 34 as shown in partial figure c, and a second layer 35 forming the outermost stiffener is laminated on the core 28a. Next a second core 28b is arranged on top of the second layer 35 in the manner shown in partial figure d, and a third layer 36 forming the second stiffener is laminated on top of the second core 28b. If necessary, it is possible to form three, four, or even more integrated stiffeners by using several cores. When the structures are laminated, the structure may be arranged with the tools into a vacuum bag or the like, and a negative pressure created and the structures hardened. After this, the cores may be pulled out and the formed leading edge element detached from the mould. Further, any necessary finishing may be done before the element is mounted on the wing or stabilizer.

It should be noted that the skin plate 13 of the leading edge element 9 need not necessarily be made of a composite material, but it may in some cases be made of an aluminium alloy or the like.

Further, we note that a composite material may comprise one or more reinforcing fibre types and one or more binding agents. The reinforcing fibre may for instance be glass fibre, carbon fibre, aramid fibre or the like. The binding agent may be a suitable plastic material, such as resin or the like.

Composite parts may be manufactured with an RTM (Resin Transfer Moulding) method, for example. RTM is suitable for the manufacture of a integrated leading edge element. Further, RTM is suitable for the manufacture of composite components for a leading edge element assembled from parts. In the RTM method, the reinforcing fibres or reinforcing blanks are set in a mould, after which the mould is closed. Then, resin or a corresponding binding agent may be injected into the mould. Further, it is also possible to use a Prepreg material, that is, a pre-impregnated reinforcing agent that may be hardened in an autoclave.

In some cases, the features presented in this application may be used as such independent of other features. However, the features presented in this application may also, if necessary, be combined to form various combinations.

The drawings and the related description is only intended to illustrate the idea of the invention. The invention may vary in detail within the scope of the claims.

The invention claimed is:

1. A leading edge element of an aircraft, which is arrangeable on the leading edge of a wing or stabilizer and which comprises:
    a skin plate which has a closed front edge and an open tail edge and which comprises an outer surface and an inner surface,
    at least one stiffener comprising an elongate piece that is fastened to the inner surface of the skin plate with a length of the elongate piece disposed along a length of the leading edge element such that the inner surface of the skin plate and the elongate piece define an elongate space on the front edge of the leading edge element, wherein the elongate piece comprises at least one transverse through-groove that extends a predefined distance along a height of the elongate piece.

2. A leading edge element as claimed in claim 1, wherein the elongate space on the front edge of the leading edge element is hollow.

3. A leading edge element as claimed in claim 1, wherein the elongate space on the front edge of the leading edge element is filled with at least one filling agent.

4. A leading edge element as claimed in claim 1, wherein said elongate piece is plate-like and comprises fastening sections along longitudinal edges thereof that fasten to the inner surface of the skin plate.

5. A leading edge element as claimed in claim 1, wherein, in addition to the at least one stiffener, the leading edge element comprises at least a second stiffener comprising an elongate piece having a length disposed along the length of the leading edge, the elongate piece of the second stiffener being arranged at a distance from the elongate piece of the at least one stiffener and being parallel thereto.

6. A leading edge element as claimed in claim 1, wherein said elongate piece is plate-like and comprises fastening sections along longitudinal edges thereof, wherein each of the fastening sections extends from the longitudinal edges in the same direction,
    wherein the leading edge element comprises, in addition to said at least one stiffener, a second stiffener that comprises an elongate piece with fastening sections, the elongate piece of the second stiffener having a length disposed along the length of the leading edge element and being parallel to and spaced from the elongate piece of the at least one stiffener, the fastening sections of the elongate piece of the second stiffener extending in the same direction as the fastening sections of the elongate piece of the at least one stiffener.

7. A leading edge element as claimed in claim 1, wherein the elongate piece is plate-like and comprises fastening sections along respective longitudinal edges thereof, wherein each of the fastening sections extends from the longitudinal edges in the same direction, said direction being transverse to the length of the elongate piece,
wherein the leading edge element comprises at least a second stiffener comprising an elongate piece having a length that is disposed along a length of the leading edge element, and wherein the elongate piece of the at least one stiffener and the elongate piece of the second stiffener are arranged so that their respective fastening sections extend in opposite directions.

8. A leading edge element as claimed in claim 1, wherein the at least one stiffener is a tubular structure.

9. A leading edge element as claimed in claim 1, wherein the at least one stiffener is a tubular structure, and
    wherein the at least one stiffener comprises a first fastening surface and a second fastening surface arrangeable against the inner surface of the skin plate and planar side walls connecting the fastening surfaces.

10. A leading edge element as claimed in claim 1, wherein the at least one stiffener is a tubular structure with ends, and the ends of the tubular stiffener comprise transverse flanges, and the tubular stiffener and its end flanges form together a box-type structure.

11. A leading edge element as claimed in claim 1, wherein the at least one stiffener has elongate top and bottom edges, the through-groove extends from the bottom edge of the stiffener toward the top edge, and the through-groove ends before the top edge of the stiffener.

12. A leading edge element as claimed in claim 1, wherein the at least one stiffener comprises at least two stiffener components that are arranged consecutively along a length of the at least one stiffener with a gap of predetermined size between the at least two stiffener components.

13. A leading edge element as claimed in claim 1, wherein the skin plate and the at least one stiffener are separate components that are made in separate steps and fastened to each other when the leading edge element is assembled.

14. A leading edge element as claimed in claim 1, wherein the skin plate and the at least one stiffener of the leading edge element are manufactured at the same time and are integral with each other.

15. A leading edge element as claimed in claim 1, wherein the at least one stiffener comprises at least one transverse flange that is fastenable to the support structure of a wing or stabilizer to transmit forces from the stiffener to the support structure.

16. A leading edge element as claimed in claim 1, wherein the at least one stiffener is made of a composite material.

17. A method for manufacturing a leading edge element of a wing or stabilizer of an aircraft, the method comprising
    forming an elongated skin plate with a uniform front edge and an open tail edge,
    fastening at least one stiffener comprising an elongated stiffener piece between respective portions of an inner surface of the skin plate with the elongated stiffener piece is disposed with a length of the elongated stiffener piece along a length of the leading edge element, wherein the elongated stiffener piece comprises at least one transverse through-groove that extends a predefined distance along a height of the elongated stiffener piece,
    wherein said at least one stiffener is closer to the front edge of the leading edge element than any other stiffener in the leading edge element such that there is an elongated space defined by the inner surface of the skin plate and the at least one stiffener on the front edge of the leading edge element, said elongated space being without stiffeners.

18. A method as claimed in claim 17, comprising:

manufacturing the skin plate and the at least one stiffener in separate steps, the at least one stiffener being manufactured of a composite material, and assembling the leading edge element by fastening the at least one stiffener to the inner surface of the skin plate.

19. A method as claimed in claim 17, comprising:

manufacturing the skin plate and the at least one stiffener of a composite material, and integrating during manufacturing the skin plate and the at least one stiffener.

20. A method as claimed in claim 17, comprising:

manufacturing the skin plate and the at least one stiffener of a composite material, and integrating during manufacturing the skin plate and the at least one stiffener, forming the skin plate against a mould surface, whereby an outer surface of the skin plate is formed against the mould and the inner surface is formed on an opposite side, arranging a core against the inner surface of the skin plate, forming an outermost stiffener layer on the core, hardening the leading edge element, and removing the core.

21. An aircraft wing that comprises:

at least one front spar on the leading edge side of the wing, at least one rear spar on the trailing edge of the wing, several wing ribs between the front spar and rear spar, a top skin plate and a bottom skin plate, several stringers between the skin plates and wing ribs, and at least one leading edge element arranged on the front side of the front spar, the at least one leading edge element comprising the leading edge element according to claim 1.

22. An aircraft stabilizer having a leading edge side and a trailing edge side that comprises:

at least one front spar on the leading edge side of the stabilizer, at least one rear spar on the trailing edge side of the stabilizer, a plurality of stiffener elements between the front spar and rear spar, a plurality of skin plates, at least one leading edge element arranged on a front side of the front spar, the at least one leading edge element comprising the leading edge element of claim 1.

23. A leading edge element as claimed in claim 1, wherein the at least one stiffener has a U-shaped cross-section.

24. A leading edge element of an aircraft, which is arrangeable on the leading edge of a wing or stabilizer and which comprises:

a skin plate comprising a closed front edge and an open tail edge and which comprises an outer surface and an inner surface, at least one stiffener comprising an elongate piece that is fastened to the inner surface of the skin plate with a length of the elongate piece disposed along a length of the leading edge element such that the inner surface of the skin plate and the elongate piece define an elongate space on the front edge of the leading edge element, wherein the at least one stiffener comprises at least one transverse through-groove that extends a predefined distance along a height of the stiffener, and the at least one stiffener has elongate top and bottom edges with the through-groove extending from the bottom edge of the stiffener toward the top edge, wherein the through-groove ends before the top edge of the stiffener.

* * * * *